Oct. 31, 1933.  W. E. WUNDERLICH  1,932,566
SPRING ASSEMBLING MECHANISM AND METHOD
Filed Nov. 21, 1930  3 Sheets-Sheet 1
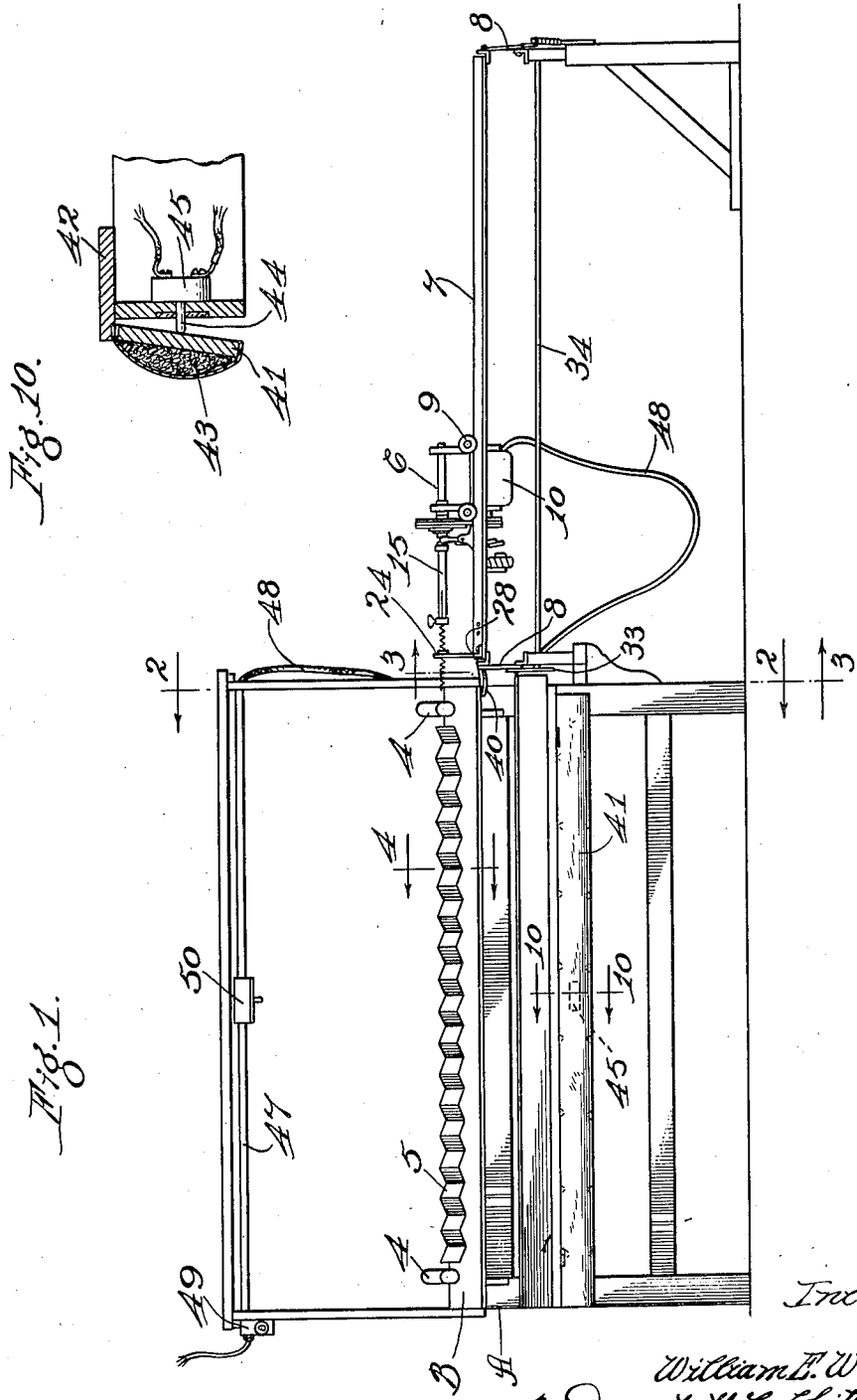

Oct. 31, 1933.   W. E. WUNDERLICH   1,932,566
SPRING ASSEMBLING MECHANISM AND METHOD
Filed Nov. 21, 1930   3 Sheets-Sheet 2
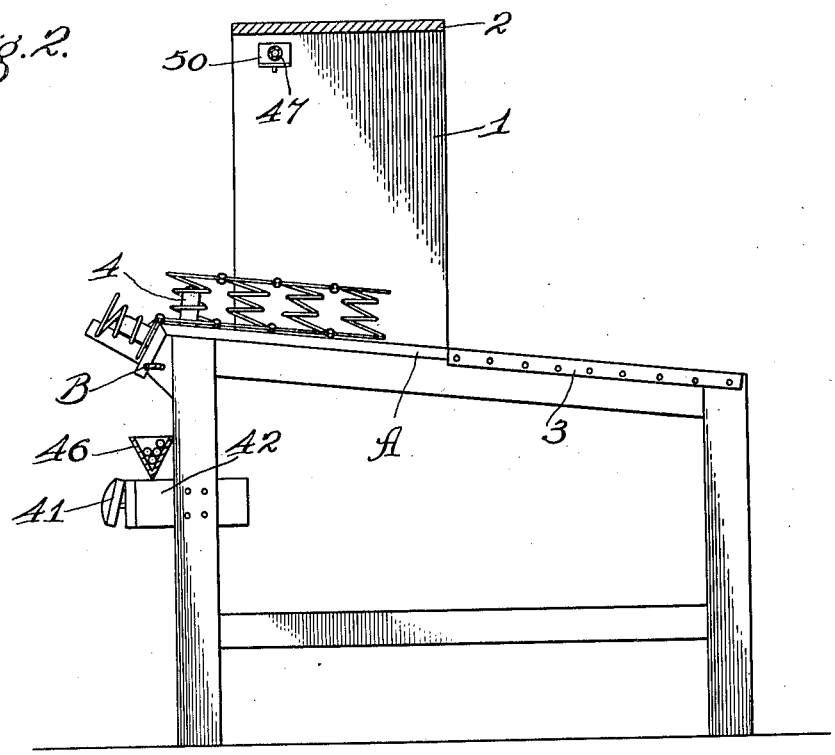
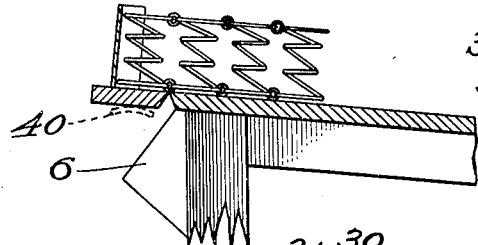
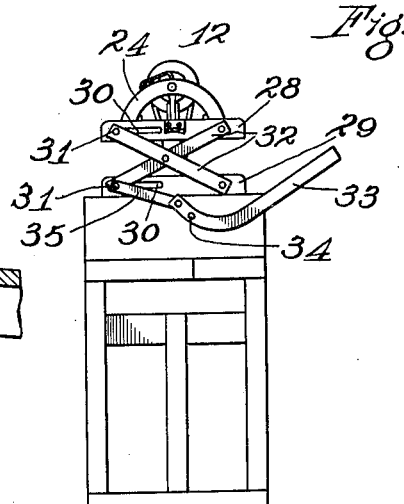
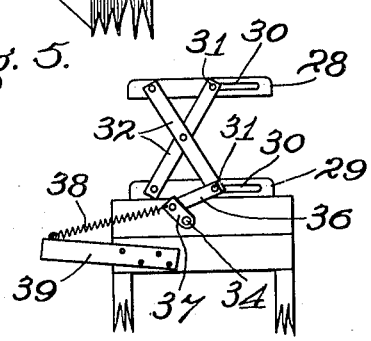
Inventor
William E. Wunderlich.
By Dyrenforth, Lee, Chritton and Wiles
Attys.

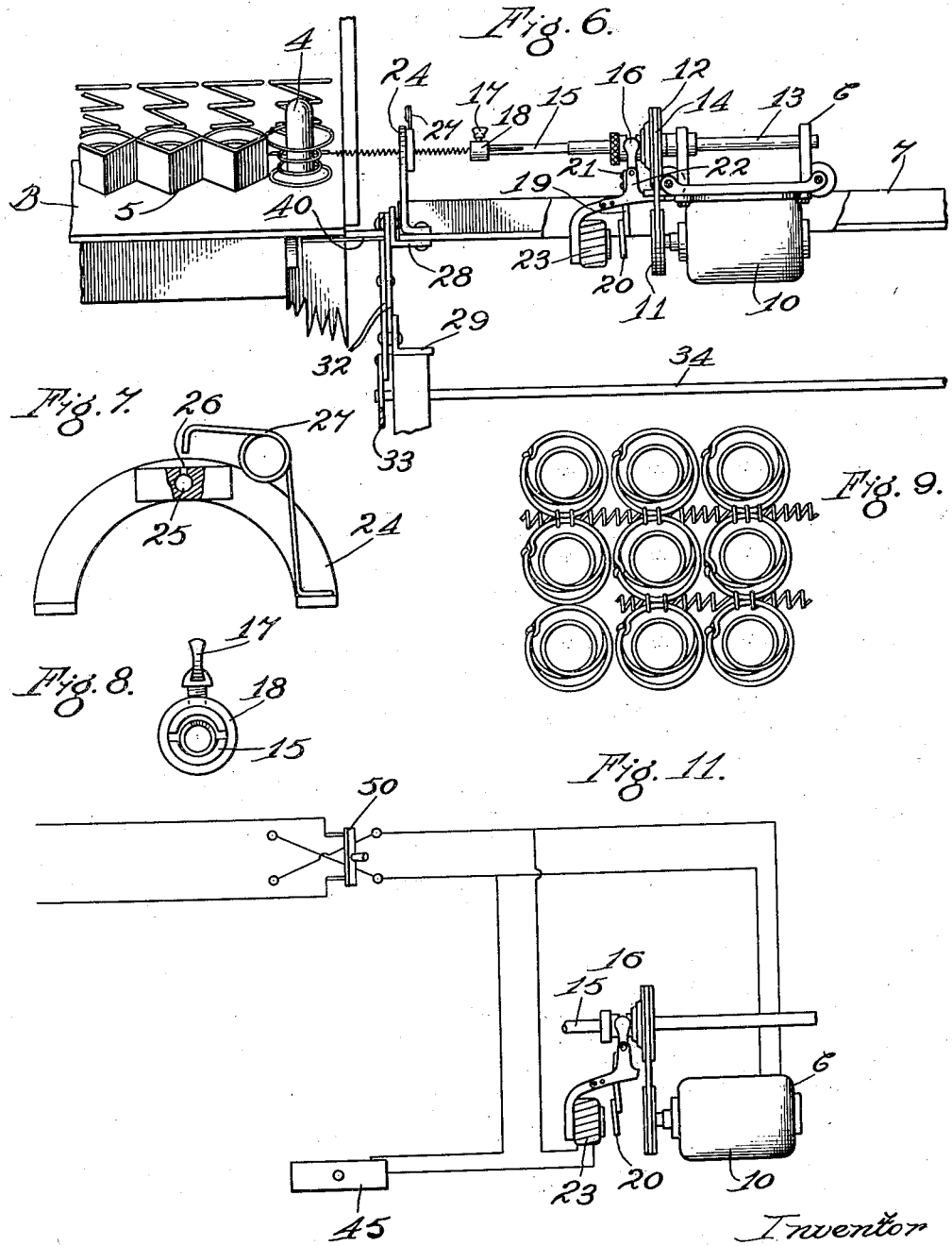

Patented Oct. 31, 1933

UNITED STATES PATENT OFFICE 1,932,566

SPRING ASSEMBLING MECHANISM AND METHOD

William E. Wunderlich, Muncie, Ind., assignor of one-half to S. Karpen & Bros., Chicago, Ill., a corporation of West Virginia, and one-half to Hager Manufacturing Co., Muncie, Ind., a corporation of Indiana Application November 21, 1930
Serial No. 497,298

27 Claims. (Cl. 140—3)

This invention relates particularly to a method and mechanism for enabling spiral springs, such as upholstery springs, cushion springs or the like, to be readily assembled into a spring structure.

For illustration, a spring structure, for the assembly of the members of which the present invention is well suited, may consist of a plurality of adjacent rows of springs having their terminal portions connected by helical connector-wires or springs, it being understood that the terminal portion of the spiral spring is either the upper end portion or the lower end portion of the spring.

In accordance with the present invention, means are provided whereby helical connector springs or wires may be successively threaded into engagement with the terminal portions or other adjacent portions of the springs, thus greatly facilitating the assembling operation.

The primary object of the present invention is to provide means for facilitating the operation of connecting together the terminal or other adjacent portions of upholstery springs, or cushion springs. After a spring-structure has been assembled, it may be introduced to a casing, or jacket, suitable padding of cotton, hair, or the like, being introduced at the same time, if desired.

The invention is illustrated in its preferred embodiment in the accompanying drawings, in which—

Figure 1 is a front view in elevation of apparatus embodying my invention;

Figure 2 is a sectional view, the section being taken as indicated at line 2 of Fig. 1;

Fig. 3 is a part sectional, part elevational view, the view being taken from line 3 of Fig. 1;

Fig. 4 is a sectional view, the section being taken as indicated at line 4 of Fig. 1;

Fig. 5 is an enlarged detail view of the outer end of the link adjusting mechanism employed;

Fig. 6 is a broken detail view of apparatus employed to drive the helical connector-springs;

Fig. 7 is a broken detail view of means employed to guide the helical connectors;

Fig. 8 is a front detail view of the clamping means which is adapted to engage the end of a spiral connector-spring;

Fig. 9 is a plan view of springs connected by helical connectors;

Fig. 10 is a sectional detail view of a knee-bar or kick-on which controls the clutch mechanism; and Fig. 11 is a schematic view of the wiring layout.

Referring to the construction illustrated, A represents a spring supporting platform or table, B represents a tilting spring support; and C represents helical-connector driving mechanism.

The supporting means A may comprise any suitable platform, table or floor and may rest upon any suitable supports. In the illustration given, the supporting mechanism is in the form of a table which is inclined rearwardly. An arch 1 may be formed above the table with its top wall 2 affording a shelf upon which springs, etc. may be placed. If desired, a sheet metal strip 3 may be secured to the top of the table A as a protection for the table and to facilitate the sliding of the springs thereon. At its front, the table may be provided on either side with a peg or post 4 adapted to engage the endmost springs of a row. As shown more clearly in Fig. 2, the posts 4 thus serve to support upon the table a plurality of rows which have been secured together in the manner hereinafter described.

The tilting leaf or support B may be secured to the front edge portion of table A by hinges or any other suitable means. Preferably the adjacent edges of the member 13 and table A are beveled so as to permit lowering of the member B. In the illustration given, the tilting member B is equipped with a spacer form or support 5 adapted to hold in spaced relation a row of separate springs which are to be attached to the front row of springs on table A. The form 5 may be given the zig-zag shape, illustrated more clearly in Fig. 1, and may be formed of metal or any other suitable material. The form member is fixedly secured to the tilting leaf 5, between the end posts 4. To support the member B in lower position, a bracket member 6, having an inclined front wall, may be secured to one of the front standards upon which table A rests.

The drive mechanism C may comprise any suitable means for rotating and passing the connector helicals between rows of springs. As illustrated, the mechanism is carried by tracks 7, which may be formed by angle irons, and which rest at their ends upon adjustable mechanism 8. The tracks preferably are slightly inclined downwardly toward their outward ends. A carriage equipped with wheels 9, or other anti-friction means, may be used to carry the mechanism upon the tracks 7. Supported in the carriage is a motor 10 provided with a drive wheel 11. A driven wheel 12 is supported upon a shaft 13 rotatably mounted above the motor 10 and is connected to the drive wheel 11 by a belt 14. The shaft 13 is connected to a rotatable driving arm 15 by means of a clutch 16. At its forward end, the driving arm 15 is hollow and is adapted to receive the end of a helical connector-spring. As shown more clearly in Fig. 8, the forward end of the driving arm is split and is adapted to grip the end of the connector-spring when pressure is exerted thereon by clamping screw 17 which is in threaded engagement with a collar 18.

The clutch 16 is rigidly connected to a swing arm 19 which is provided at its lower end with a disc 20. The arm 19 is pivotally connected at 21 to a stationary bracket member 22. Also connected to the bracket 22 is a coil magnet 23 which when energized is adapted to draw the disc 20 in a forward direction.

Supported at the front end of the track rails 7 is a guide arch 24. As shown more clearly in Fig. 7, the arch is provided at a central portion with an opening 25 through which the helical connector-springs may be passed. Above the opening 25 is a slot 26 adapted to receive the end of a spring member 27. Spring 27 is so tensioned as to maintain its end normally within the slot 26 and in engagement with the spiral connectors passing therethrough.

The track members 7 rest at their ends upon cross pieces 28 which may be in the form of angle irons. Similar cross pieces 29 are positioned below the members 28 and rest upon stationary supports. As shown more clearly in Figs. 3 and 5, the cross pieces 28 and 29 are provided with slots 30 adapted to receive connecting bolts or pegs 31 with which the lifting link members 32 are provided. An actuating lever 33 is rigidly secured upon rotatable rod 34 and is pivotally connected to the short arm 35. The short arm or link 35 is connected by the pivot 31 to the lower end of one of the members 32. At the other end of the link adjusting mechanism, as shown more clearly in Fig. 5, a short link 36 connects one of the members 32 to a bar 37, which is also rigidly mounted upon rotatable rod 34. A spring 38 is connected to the upper end of the bar 37 and to the end of a projecting arm 39. Springs 38 is maintained under tension and tends to draw the free end of the bar 37 in a forward direction.

Secured to the inner cross piece 28 is a lifting projection 40 which is adapted to engage the adjacent end of the tilting leaf or plate B.

The coil magnet 23 may be controlled by a knee-switch or kick-on 41, or by any other suitable and convenient means. In the illustration given, the member 41 is hingedly secured at one end to a supporting frame member 42 and may be provided at its front face with a cushion 43. A spring urged plunger 44 is adapted to make a contact, when pressed inwardly with a terminal in box 45, and thus to complete the circuit by which the magnet 23 is energized.

If desired, a trough 46 may be supported above the member 42 and used to carry the helical connector-springs which are to be fed to the apparatus.

Electric wires which are needed for supplying current to the motor 10 and magnet 23 may be conveniently housed within the pipe 47 and cable 48. A switch 49 may be conveniently supported upon the arch 1 and a reversing switch 50 may be carried by the tube 47.

In the operation of the apparatus, the operator places a row of springs upon the table A, along with other parallel rows of springs which may already have been connected with the springs in the front row. The operator then places separate springs upon the tiltable leaf B, the end springs being placed about the posts 4 and the others within the V-recesses of the spacer form 5. During this operation, the leaf B may be in either raised or lowered position, although it is preferred to have the leaf tilted. With the leaf B in lowered position, the top portions of the adjacent rows of springs are separated while the base portions are brought close together.

Assuming the tracks 7, with the driving mechanism C, to be in lowered position, and the driving mechanism C at the outer or lower ends of the track members, the operator takes a connector-spring from the trough 46 and inserts one end within the split hollow end of driving arm 15 and turns the screw 17 to clamp the arm against the spring, the other end of the connector-spring having been passed through the guiding hole 25. To facilitate the passing of the connector-spring through the opening 25, the spring rod 27 may be retracted so as to lift its straight end out of slot 26. When the connector-spring is in position, the spring rod 27 may be released, thus permitting the end of the rod to engage the helical connector-spring. The motor 10 may then be started by turning switch 49. At this time, since there is no current passing through the magnet 23, the swing arm 19 hangs in a substantially vertical position and the clutch 16 is not engaged. When the operator is ready to pass the connector-spring between the rows of springs, he presses the hinged member or kick-on 41 with his knee and the plunger 44 makes a contact which completes the circuit. The magnet 23 on being energized draws the disc 20 forward and the clutch 16 brings the shaft 15 into operative engagement with the shaft 13. The drive arm 15 turns the helical connector-spring which is in contact with the spring rod 27 and the connector spring begins to advance, weaving about the contiguous base portions of the springs. When the connector-spring has advanced the length of the row, the operator removes the pressure upon the member 41, demagnetizing the member 23. The clutch member 16 is thus released and the drive arm 15 ceases to rotate.

After the helical connector-spring, or pigtail, has been woven about the base portions of the springs, it is desired to connect the top portions of the springs in a similar manner. To accomplish this, the operator depresses the lever 33 and the link adjusting mechanism elevates the tracks 7 to bring the driving arm 15 to a position aligned with the top portions of the springs which are to be united. Spring 38 holds the link mechanism in extended position. The lever 33 by means of rod 34 actuates the link mechanism at both ends of the track simultaneously. As the track members 7 are raised, together with the driving mechanism, the lifting extension 40 engages the tiltable leaf B and raises it to a substantially horizontal position, thus bringing the top edge portions of the springs into close relation. During this operation, the carriage for the motor and actuating mechanism has returned upon the inclined tracks 7 to the lower or starting position. A connector-spring may be introduced into the driving arm 15 and driven through the springs in the manner already described.

After the new row of springs has been connected in the manner described, the springs may be lifted out of engagement with the posts 4 on the leaf B and placed upon the posts 4 on the table. Another series of springs may then be placed in position upon the leaf B and the operation may be repeated.

With the apparatus described, the operator can readily assemble the springs. The tilting support aids in the assembly and alignment of the springs and permits the operator to observe clearly the course of the helical connector as it passes between the rows of springs. In the event that the connector-spring fails to satisfactorily join certain springs, the operator may turn the switch 50 and reverse the operation of the motor, the connector-spring being thus caused to follow a backward course. When the trouble has been removed, the switch 50 may be swung in the opposite direction to cause the connector-spring to advance. Contact of the rotating helical connector with the rod 27 and spiral springs causes the connector to move forward or backward according to its direction of rotation and the connector draws with it the driving or feeding mechanism C. Upon being released from engagement with the connector spring, the mechanism C will return by gravity to the starting position.

The foregoing detailed description has been given for clearness of understanding only, and no unnecessary limitations should be understood therefrom, but the appended claims should be construed as broadly as permissible, in view of the prior art.

I claim:

1. In combination, supporting means for springs, means for tilting some of said springs to bring portions thereof in closer relation to other springs, and means for weaving helical connector wires through the juxtaposed portions of said springs.

2. In combination, means for supporting two rows of springs in close relation, means for tilting one row to bring the bottom portion of the springs therein in close proximity to portions of the springs in the other row, and means for weaving helical connector wires about said juxtaposed spring portions.

3. In combination, means for supporting two rows of springs in parallel relation, tilting means adapted to bring the bottom portions of the springs in the two rows in close proximity, means for weaving connector helicals about said juxtaposed spring portions, raising means for bringing the top portions of said springs together, and means for weaving connector helicals through the adjacent top portions of said springs.

4. In combination, means for supporting two rows of springs in close relation, tilting means for bringing together successively the terminal portions of the springs in the two rows, and means for weaving helical connector wires about the juxtaposed portions of said springs.

5. In combination, means for supporting rows of springs, tilting means for bringing together successively the bottom and top portions of the springs in one row with the corresponding portions of springs in another row and vertically adjustable driving means adapted to weave helical connector wires about the juxtaposed portions of said springs.

6. In combination, means for supporting rows of springs, tilting means for bringing successively the bottom and top portions of the springs in one row close to the corresponding portions of springs in anther row, vertically adjustable driving means adapted to weave helical connector wires about the juxtaposed portions of said springs, and means for simultaneously raising and lowering said tilting means and said driving means.

7. In apparatus of the character set forth, a form adapted to support rows of springs, a tiltable leaf member hingedly connected to said form member and adapted to support a row of springs, means for supporting said leaf member in raised and lowered positions, and means for driving helical connector wires to connect the springs carried by said leaf to springs carried by said form.

8. In apparatus of the character set forth, a form adapted to carry rows of springs, a leaf member provided with means for supporting springs in spaced and aligned relation, said leaf member being hingedly connected to said form and being adapted to be raised and lowered, means for supporting said leaf member in lowered position, and means for rotating helical connector wires to join the springs carried by the leaf to springs carried by the form.

9. In apparatus of the character set forth, spring supporting means, driving mechanism adapted to weave connector-wires through said springs, and link adjusting mechanism adapted to raise and lower said driving means.

10. In apparatus of the character set forth, spring supporting means, driving mechanism adapted to interlace helical connector wires through said springs, track members carrying said driving means and permitting longitudinal movement thereon, and means for raising and lowering said track members.

11. In apparatus of the character set forth, means for supporting springs, driving means for rotating connector helicals to connect said springs, inclined track members supporting said driving means and permitting said driving means to move away from said spring supporting means, and link adjusting mechanism adapted to raise and lower said track members.

12. In apparatus of the character set forth, a form for supporting springs, a leaf member hingedly secured thereto, a driving member adapted to weave helical connector wires through said springs, a vertically adjustable support for said driving means, and means carried by said support for raising and lowering said leaf member simultaneously with the raising and lowering of said driving means.

13. In apparatus of the character set forth, a form for supporting springs, driving means adapted to weave helical connector wires through said springs, supporting means for said driving means permitting longitudinal movement of said driving means, and a guide member adapted to guide said connector wires and cooperating with said connector wires to produce longitudinal movement thereof.

14. In apparatus of the character set forth, supporting means for springs, driving means for weaving helical connector wires through said springs, and means for supporting said driving means, said driving means comprising a motor, a driving arm provided with a clamp adapted to receive the end of a spiral connector wire, connecting means between said motor and said arm for rotating said arm, and a clutch member adapted to engage and disengage said arm and connecting members.

15. In apparatus of the character set forth, a form adapted to support springs, wire driving mechanism comprising a motor, a driving arm, means connecting said motor to said driving arm, and a clutch member adapted to bring about engagement and disengagement of said driving arm with said connecting means, magnet controlled means for actuating said clutch, and a switch member operatively supported on said form whereby the operator may control the energizing of said magnet.

16. A method of assembling and connecting upholstery springs, which comprises arranging and supporting the springs in parallel rows, tilting one row of springs to bring the base portions thereof in proximity to the base portions of the springs in an adjacent row, and rotating a connector helical so as to interlace the base portions of said springs.

17. A method of assembling and connecting upholstery springs, which comprises arranging and supporting the springs in parallel rows, tilting one row of springs to bring the base portions thereof in proximity to the base portions of the springs in an adjacent row, rotating a connector helical so as to interlace the base portions of said springs, raising said first mentioned row of springs to bring the top portions thereof in proximity to the top portions of the springs in an adjacent row, and weaving a helical connector wire about the juxtaposed top portions of said springs.

18. In combination, a carriage, a revolvable chuck mounted on the carriage for fixedly holding a helical, mechanism on the carriage operable to rotate the chuck, a fixed member with which the helical has spinning engagement whereby the helical is advanced and retracted by rotation of the chuck.

19. In combination, a carriage, a revolvable chuck mounted on the carriage for fixedly holding a helical, mechanism on the carriage operable to rotate the chuck, a fixed member with which the helical has spinning engagement whereby the helical, chuck and carriage are advanced by rotation of the chuck.

20. In combination, a track, a carriage movable on the track, a chuck mounted on the carriage for fixedly holding a helical, mechanism on the carriage operable to rotate the chuck and helical and a fixed member with which the chuck has spinning engagement whereby the helical is advanced and retracted in the direction of the track by rotation of the chuck.

21. In combination, a track, a carriage movable on the track, a chuck mounted on the carriage for fixedly holding a helical, mechanism on the carriage operable to rotate the chuck and helical, and a fixed member with which the chuck has spinning engagement whereby the helical, chuck and carriage are advanced and retracted together by correspondingly rotating the chuck in opposite directions.

22. Apparatus for fabricating spring assemblies comprising means for supporting spring units arranged in rows with portions of said units adjacent each other, a carriage movable in the direction of said rows, a revolvable chuck on said carriage for fixedly holding a helical, mechanism on the carriage operable to rotate the chuck and helical, a fixed member with which the helical has spinning engagement whereby rotation of the chuck advances the helical into interlocking engagement with the adjacent portions of said units.

23. Apparatus for fabricating spring assemblies comprising means for supporting a plurality of spring units arranged in two closely spaced parallel rows with portions of said units adjacent each other, a carriage movable in the direction of said rows, a revolvable chuck on said carriage for fixedly holding a helical, mechanism on the carriage operable to rotate the chuck and helical, the axis of rotation of the chuck being in substantial alignment with said adjacent portions, a fixed member with which the helical has spinning engagement whereby rotation of the chuck advances the helical into interlocking engagement with said adjacent portions, the advance of said helical causing a corresponding advance of the chuck and carriage.

24. Apparatus for fabricating spring assemblies comprising a table providing a support for a plurality of spring units arranged in rows with portions of the units in one row closely spaced to corresponding portions of units in the other row, a carriage movable towards and away from the table, a revolvable chuck mounted on the carriage for fixedly holding a helical, mechanism on the carriage operable to rotate the chuck, the axis of rotation of the chuck being in substantial alignment with said adjacent unit portions, a fixed member in the path of said chuck, the helical having spinning engagement with said member whereby the helical is advanced by rotation of the chuck into interlocking engagements with said adjacent unit portions, the advance of the helical causing a corresponding advance of said chuck and carriage.

25. Apparatus for fabricating spring assemblies comprising a table providing a suport for a plurality of spiral springs arranged in two parallel rows with a portion of the end coils of the springs of one row in substantial longitudinal alignment with the corresponding portions of the springs in the adjacent row, a carriage movable towards and away from the table, a revolvable chuck mounted on the carriage for fixedly holding a helical, the axis of rotation of the chuck being in alignment with said substantially aligned portions of said springs, mechanism on the carriage operable to rotate the chuck, and a fixed member with which the helical has spinning engagement whereby said helical is advanced into interlocking engagement with said closely spaced substantially aligned portions of the adjacent rows of springs.

26. Apparatus for fabricating spring assemblies comprising a table providing a support for a plurality of spiral springs arranged in parallel rows with the lower end coils of the springs of one row adjacent the corresponding portions of the springs of the other row, a carriage movable towards and away from the table along a path substantially parallel to said row, a revolvable chuck mounted on the carriage for fixedly holding a helical, the axis of the chuck being in substantial alignment with the adjacent portions of the springs of two of said rows, mechanism on the carriage operable to rotate the chuck, and a fixed member with which the helical has spinning engagement whereby said helical is advanced into interlocking engagement with said adjacent portions of the springs with which it is in axial alignment.

27. Apparatus for fabricating spring assemblies comprising a table, an inclined shelf forming an extension of the table, means on the shelf providing a support for a plurality of inclined spiral springs arranged in a row with a portion of the end coils of said inclined springs in substantial longitudinal alignment with the corresponding portions of a plurality of springs arranged in a parallel vertical row on the table adjacent said shelf, a carriage movable in a path parallel to said rows, a revolvable chuck mounted on the carriage for fixedly holding a helical, the axis of rotation of said chuck being in substantial alignment with said substantially aligned portions of said rows of springs, mechanism on the carriage operable to rotate the chuck and helical spring, a fixed member with which the helical has spinning engagement whereby rotation of the chuck advances the helical into interlocking engagement with said aligned portions of said vertical and inclined rows of springs.

WILLIAM E. WUNDERLICH.